(12) United States Patent
Risbood

(10) Patent No.: US 7,660,525 B2
(45) Date of Patent: Feb. 9, 2010

(54) METHODS AND APPARATUS FOR OPTIMIZING UTILIZATION IN A RING NETWORK

(75) Inventor: Pankaj Risbood, Roselle, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 682 days.

(21) Appl. No.: 11/065,839

(22) Filed: Feb. 25, 2005

(65) Prior Publication Data

US 2006/0193632 A1     Aug. 31, 2006

(51) Int. Cl.
*H04J 14/02*     (2006.01)
(52) U.S. Cl. .............................. 398/4; 398/59; 398/69
(58) Field of Classification Search ............... 398/3–4, 398/59, 69
See application file for complete search history.

(56) References Cited

U.S. PATENT DOCUMENTS

| | | | | |
|---|---|---|---|---|
| 6,075,631 | A * | 6/2000 | Bala et al. | 398/1 |
| 7,349,341 | B2 * | 3/2008 | Allasia et al. | 370/235 |
| 2007/0172237 | A1 * | 7/2007 | Risbood | 398/59 |

OTHER PUBLICATIONS

Bala, K. et al. "Towards hitless reconfiguration in WDM optical networks for ATM transport." Global Telecommunications Conference, 1996. Globecom '96. 'Communications: The Key to Global Prosperity.' Nov. 18-22, 1996: 316-320, vol. 1.*
Saad, M. And Z-Q. Luo. "Reconfiguration with no service disruption in multifiber WDM networks." Journal of Lightwave Technology, vol. 23, No. 10. Oct. 2005: 3092-3104.*
T.J. Carpenter et al., "Demand Routing and Slotting on Ring Networks," DIMACS Technical Report, Technical Report, pp. 1-28, Jan. 1997.
A.A.M. Saleh et al., "Architectural Principles of Optical Regional and Metropolitan Access Networks," Journal of Lightwave Technology, vol. 17, No. 12, pp. 2431-2448, Dec. 1999.
M.D. Feuer et al., "Routing Power: A Metric for Reconfigurable Wavelength Add/Drops," OFC, pp. 156-158, 2002.
S. Acharya et al., "Hitless Network Engineering of SONET Rings," Globecom, 5 pages, 2003.
Y-S. Myung et al., "Optimal Load Balancing On SONET Bidirectional Rings," ABI/INFORM GLobal, Operations Research, vol. 45, No. 1, pp. 148-152, Jan. 1997.

(Continued)

*Primary Examiner*—Leslie Pascal
(74) *Attorney, Agent, or Firm*—Ryan, Mason & Lewis

(57) ABSTRACT

Techniques are disclosed for generating a hitless migration plan to optimal state, given an optimal routing and wavelength assignment for demands. For example, a technique for use in performing a circuit transition in accordance with an optical ring-based network comprises the following steps/operations. First, a first (e.g., initial) circuit layout and a second (e.g., final) circuit layout for a given set of demands to be routed on the optical ring-based network are obtained. Then, a minimum number of free wavelengths required to transition the network from the first circuit layout to the second circuit layout is determined such that substantially no network service disruption occurs due to the circuit transition.

20 Claims, 4 Drawing Sheets

(A) LAYOUT-1

(B) LAYOUT-2

OTHER PUBLICATIONS

A. Schrijver et al., "The Ring Loading Problem," SIAM Journal on Discrete Mathematics, pp. 1-16, Feb. 1998.

S. Cosares et al., "An Optimization Problem Related to Balancing Loads on SONET Rings," Telecommunication Systems, vol. 3, pp. 165-181, Jul. 1994.

Y-S. Myung et al, "On the Ring Loading Problem with Demand Splitting: A Faster Algorithm and Experimental Evaluation," Operations Research Letters, pp. 1-15, Mar. 2004.

Gerstel et al., "Wavelength Assignment in a WDM Ring to Minimize Cost of Embedded SONET Rings," Proc. IEEE Infocom'98, 1998, pp. 94-101, vol. 1.

* cited by examiner

FIG. 1
PRIOR ART
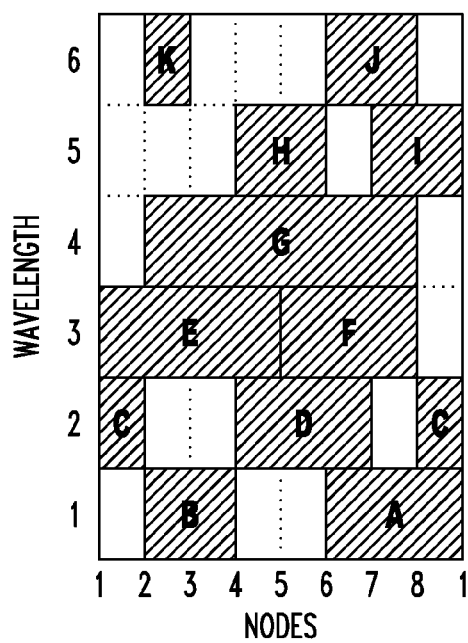
(A) INITIAL LAYOUT
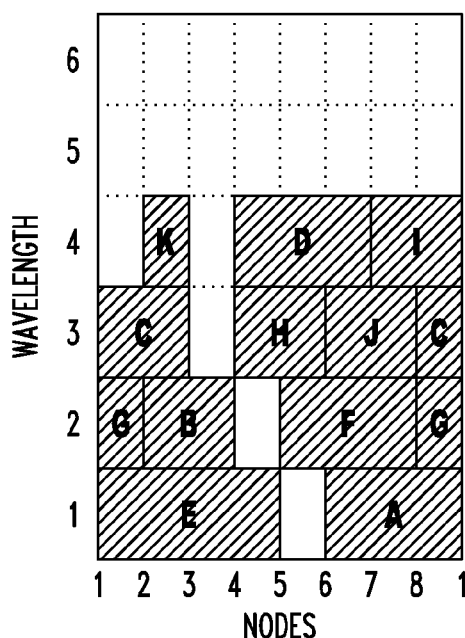
(B) FINAL LAYOUT
FIG. 2
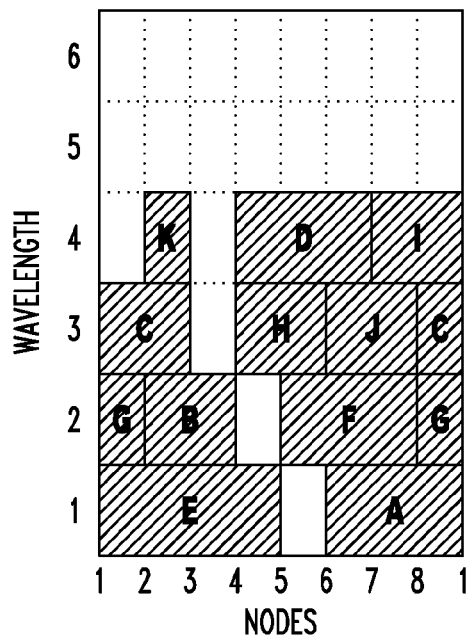
(A) LAYOUT-1
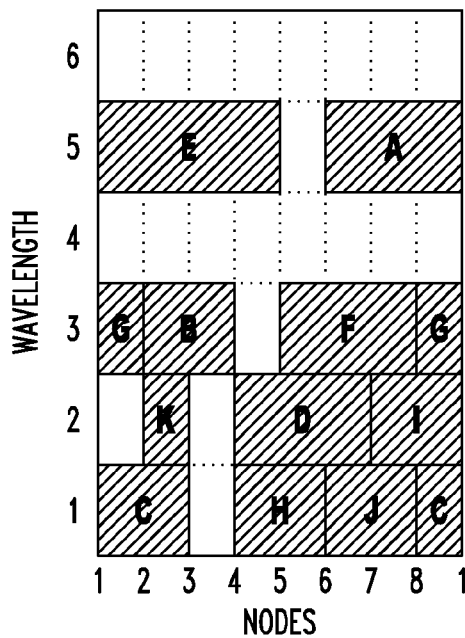
(B) LAYOUT-2

FIG. 3

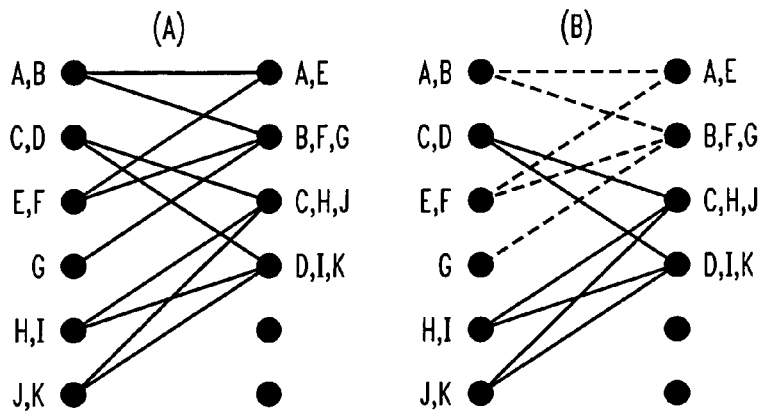

FIG. 4

Dynamic Programming Algorithm Pseudo-code

- Input: For a component of transition graph – circuit set $D$, initial and final partition sets $P_0$ and $P_f$
- Output: A sequence of intermediate states in transition requiring minimum number of free wavelengths.

1) initialize bit vectors for all states.
2) Create a table of tuples $< W_i, N_{if}, I_i >$ of size $2^{W_f}$, where $W_f = |P_f|$
3) Initialize $W_i$ /* Can also be computed on the fly */
4) Set $N_{if}$ and $I_i$ to $-1$ for all states,
5) Set $N_{ff} = 0$.
6) FindMinTransition(0)

subroutine FindMinTransition(state i)

1) return $N_{if}$ if known.
2) $N_{if}$ = MAXVAL;
3) For each state $j$ s.t. $P_j \cap P_f - P_i \cap P_f$ has exactly one subset say T.
    a) tmp = FindMinTransition(j) $- (W_i - W_j)$.
    b) tmp = max (0, tmp);
    c) if $\exists \theta_{ix} \in P_i$ s.t. $\theta_{ix} \subseteq T$ then tmp = tmp + 1 and $I_i = j$.
    d) if (tmp $> N_{if}$) $N_{if}$ = tmp;
4) return $N_{if}$.

METHODS AND APPARATUS FOR OPTIMIZING UTILIZATION IN A RING NETWORK

FIELD OF THE INVENTION

The present invention relates generally to the field of data communication networks and, more particularly, to optimized utilization techniques for use in accordance with ring networks.

BACKGROUND OF THE INVENTION

Wavelength Division Multiplexing (WDM) is a type of multiplexing developed for use on an optical fiber. WDM modulates each of several data streams onto a different part of the light spectrum. That is, WDM transmits each data stream at a different optical wavelength.

WDM has established itself as an inexpensive and reliable mechanism for transporting information bits in metro and long-haul networks. WDM networks also provide the underlying transport for the growing Internet data traffic that has more variance and, therefore, creates greater network churn. As this traffic continues to grow and capital budgets fail to keep up (or, even shrink), service providers are increasingly seeking tools that enable them to extract higher utilization from their existing infrastructure.

Of course, the desire to extract higher utilization from a network is not restricted to WDM networks. Other types of ring networks benefit from improved network utilization techniques. For instance, improved network utilization techniques would be equally beneficial in ring networks based on synchronous optical network (SONET) or synchronous digital hierarchy (SDH) standards, particularly when all circuits are of uniform granularity.

Traditional optimization tools solve the problem of improving network utilization by providing a optimal layout, comprising a routing and wavelength assignment plan. For example FIG. 1A represents the initial routing and wavelength assignment plan for the set of circuits on a WDM ring of eight nodes and six wavelengths, while FIG. 1B shows the optimum layout generated by an optimization algorithm such as is disclosed in T. J. Carpenter et al., "Demand Routing and Slotting on Ring Networks;" DIMACS Technical Report, Tech Rep., January 1997, the disclosure of which is incorporated by reference herein.

However, unlike network design, online or real-time optimization is performed on networks that carry live traffic, so it should be "hitless," i.e., cause no service disruption. Thus, in addition to optimizing the layout of circuits, it is equally desirable to determine a hitless re-routing sequence to migrate the ring from the original to new optimal layout. Otherwise, this effort has little use in practice.

In traditional WDM rings comprising optical add-drop multiplexer (OADM) elements, re-routing traffic was often a very cumbersome task and in many cases, impossible to achieve without disruption. However, newer network elements called Reconfigurable OADM or ROADM elements (see, e.g., A. M. Saleh et al., "Architectural Principles of Optical Regional and Metropolitan Access Networks," Journal of Lightwave Technology, vol. 17, December 1999; and M. D. Feuer et al., "Routing Power: A Metric for Reconfigurable Wavelength Add/Drops," OFC 2002, the disclosures of which are incorporated by reference herein), equipped with optical cross-connects, support a Bridge-n-Roll functionality similar to Automatic Protection Switching (APS). This enables circuits to be first replicated on to the new route/ wavelength (bridged), and then switched or rolled over seamlessly with no service hit. This process is akin to make-before-break in Multi Protocol Label Switching (MPLS) networks.

Thus, an online ring optimization requires addressing two critical, yet distinct problems: (1) the routing and wavelength assignment (RWA) for ring topology; and (2) the circuit migration problem.

There is vast body of research on the RWA problem on rings, since it is a variant of the well-addressed Demand Routing and Slotting Problem (DRSP). The ring sizing and the ring loading are specific examples of the DRSP and these are all proven to be NP-hard. Good approximations to these problems do exist. In fact, ring loading can be optimally solved for the case when all demands are of same granularity.

However, there is very little previous work on the circuit migration problem. S. Acharya et al., "Hitless Network Engineering of SONET Rings," Globecom, 2003, the disclosure of which is incorporated by reference herein, addressed online ring optimization problem in an integrated fashion. They found a sub-optimal solution using a cost-based heuristic along with a transition sequence. Although it performs reasonably well in practice, there is no guarantee on quality of solution.

It is therefore apparent that improved techniques are needed for dealing with the issue of providing a circuit migration sequence from a given layout to a known optimal layout obtained using any known optimal layout algorithms.

SUMMARY OF THE INVENTION

The present invention provides techniques for generating a hitless migration plan to optimal state, given an optimal routing and wavelength assignment for demands.

For example, in one aspect of the invention, a technique for use in performing a circuit transition in accordance with an optical ring-based network comprises the following steps/operations. A first (e.g., initial) circuit layout and a second (e.g., final) circuit layout for a given set of demands to be routed on the optical ring-based network are obtained. Then, a minimum number of free wavelengths required to transition the network from the first circuit layout to the second circuit layout is determined such that substantially no network service disruption occurs due to the circuit transition.

Further, the first circuit layout may be an initial circuit layout and the second circuit layout may be a final circuit layout. In such an embodiment, the initial circuit layout and the final circuit layout may each be representable as a partition of the given set of demands into subsets, wherein each subset is capable of being routed on a single wavelength. The calculating step may further include application of one or more constraints. A first constraint may be that a circuit can be moved at most once in a transition sequence. A second constraint may be that, in any intermediate state during a transition sequence, a demand $d_i$ either shares a wavelength with all demands in a set $F_i$ or a subset of demands in a set $O_i$, where, for the demand $d_i$, sets $O_i$ and $F_i$ are subsets of the given set of demands that share a wavelength with $d_i$ in the initial circuit layout and the final circuit layout, respectively.

Still further, the calculating step/operation may include representing a transition from a first (e.g., initial) partition to a second (e.g., final) partition of the demand set as a bipartite transition graph having nodes and edges, wherein each node of the graph corresponds to a subset in the first or second partition and each edge of the graph represents a transition of a demand from its first (e.g., initial) subset to its second (e.g., final) subset. Then, the calculating step/operation may include inputting a connected component of the transition graph, the given set of demands, a first (e.g., initial) partition set $P_o$ and a second (e.g., final) partition set $P_f$, and determining a transition sequence of intermediate states that require the minimum number of free wavelengths.

Advantageously, such inventive techniques enable service providers to optimize their network by implementing the optimum migration plan, determined in accordance with principles of the present invention, without affecting services and therefore is very attractive to use in practice. This ability to do hitless migration opens the possibility of frequent and pro-active optimization to maintain high levels of network utilization and saves capital in the long run.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 1A shows a diagram of an initial layout of a routing and wavelength assignment plan;

FIG. 1B shows a diagram of a final layout of a routing and wavelength assignment plan;

FIG. 2A shows a diagram of an optimal layout according to one routing and wavelength assignment plan;

FIG. 2B shows a diagram of an optimal layout according to another routing and wavelength assignment plan;

FIG. 3A shows a diagram of a transition graph for the layout of FIG. B, according to an embodiment of the present invention;

FIG. 3B shows a diagram of a connected component decomposition for the transition graph of FIG. 3A;

FIG. 4 shows illustrative pseudo-code of a dynamic programming-based hitless migration algorithm, according to an embodiment of the present invention;

DETAILED DESCRIPTION OF THE INVENTION

Figure 5:
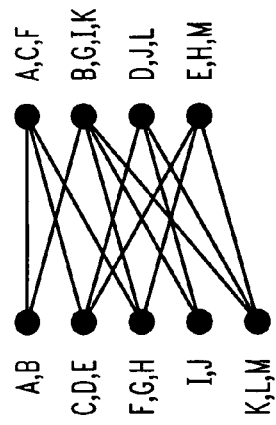
FIG. 5 shows a diagram of a sample of a connected component of a transition graph, according to an embodiment of the present invention.

The following description will illustrate the invention in the context of an exemplary WDM ring network. It should be understood, however, that the invention is not necessarily limited to use with any particular type of ring network. The invention is instead more generally applicable to any ring network in which it is desirable to generate a hitless migration plan to optimal state, given an optimal routing and wavelength assignment for demands. As used herein, the term "demand" generally refers to a bandwidth request between a source node and a destination node. Further, as used herein, the term "circuit" generally refers to a path in the network, which includes at least the source node and the destination node, that satisfies a given demand.

The remainder of the detailed description is subdivided as follows: Section I describes a hitless circuit migration problem (i.e., an optimal ring repacking problem) and describes an analysis of its properties; Section II describes a dynamic programming-based algorithm for solving the optimal ring repacking problem; and Section III describes an illustrative computing system that may be used to implement the dynamic programming-based algorithm.

I. Optimal Ring Repacking Problem

In accordance with an illustrative embodiment of the invention, techniques are provided to solve an optimization problem that we refer to as the Optimal Ring Repacking Problem (ORRP).

A. Problem Description and Complexity

We formally define ORRP as follows.

ORRP definition: Given is a WDM ring with a set of demands D. Each demand $d_i \epsilon D$ is identified by a tuple $<s_i, t_i>$, $s_i$ and $t_i$ being the source and destination node of $d_i$, respectively. Also, given is the current routing and wavelength assignment map $\psi$: $\{d_i \rightarrow \{w_i, o_i\}\}$, where $w_i$ is the wavelength occupied and $o_i$ is the orientation of the demand which can be either clockwise or counter-clockwise. Also, given is a final map $\psi'$: $\{d_i \rightarrow \{w_i', o_i'\}\}$, which corresponds to desired optimal state.

As mentioned above, the final map corresponding to the desired optimal state can be obtained using any known RWA algorithm. For example, but not limited thereto, RWA algorithms that may be directly employed and/or easily adapted for use are described in T. J. Carpenter et al., "Demand Routing and Slotting on Ring Networks;" DIMACS Technical Report, Tech Rep., January 1997; Y. Myung et al., "Optimal Load Balancing On SONET Bidirectional Rings;" Operations Research, vol. 45, January 1997; A. Schrijver et al., "The Ring Loading Problem," SIAM Journal of Discrete Math, vol. 11 I, no. 1, February 1998; and S. Cosares et al., "An Optimization Problem Related to Balancing Loads on SONET Rings," Telecommunication Systems, vol. 3, 1994, the disclosures of which are incorporated by reference herein.

Given the above, the ORRP is to find a hitless re-routing sequence for the circuits to transition from $\psi$ to $\psi'$ in a Bridge-n-Roll fashion.

Our past network optimization experience suggests that service providers always want to minimize the impact of any operation on a single customer. Hence, we impose a simple operational constraint that a circuit can be moved at most once in an entire transition sequence. Clearly transition from a current state to a final state may require some number of unused wavelengths on the WDM ring to be used as buffer space. In such a situation, a goal of ORRP is to minimize the number of such free wavelengths required to perform circuit migration.

B. Properties of ORRP

In this section, we highlight some observations regarding the properties of ORRP and exploit them to effectively solve the problem.

Let us first analyze the optimal state desired at the end of circuit migration. The final state is uniquely characterized by layout ($\psi'$) that represents routing and wavelength assignment of demands on the WDM ring. Alternatively, a layout can be represented as a partition of demand set D into subsets, $\{\Theta_l \ldots \Theta_k\}$, each of which can be routed on a single wavelength, and a wavelength number for each subset $\Theta_i$.

Consider two layouts shown in FIGS. 2A and 2B. Both layouts correspond to the same partition of a demand set, but differ in the wavelengths assigned to subsets in the partition. It is easy to see that any sequence of future demands satisfied by the layout in FIG. 2A can also be satisfied by the layout in FIG. 2B and hence they are both optimal.

This observation can be generalized as follows: For any given layout, one can always obtain an equivalent layout by changing wavelength assignment while keeping the partition induced by wavelength assignment unchanged. This behavior is a direct consequence of the fact that a demand occupies only one wavelength and all wavelengths are identical in their capacity. Hence, in a layout, the actual wavelength number assigned is immaterial. What matters is the partition of the demand set into subsets such that each subset is satisfied on a single wavelength. Thus, layouts shown in FIGS. 2A and 2B are identical and achieving either one as final state is sufficient. We call this property layout equivalence. Due to layout equivalence, ORRP is reduced to: Find a circuit migration sequence to transition from a given partition $P_o = \{\Theta_{o1} \ldots \Theta_{ok}\}$ to a final optimal partition $P_f = (\Theta_{f1} \ldots \Theta_{fk}\}$.

Layout equivalence increases the number of potential solutions but also bloats an already exponential state space. This is because any partition of the demand set can be a valid state, provided each subset can be routed on a single wavelength and there exist as many wavelengths as there are subsets in the partition. Hence, validity of a partition as a state is determined by routing. A very large state space with added routing complexity makes the problem difficult to tackle.

To reduce this complexity, we impose a simplifying constraint termed a non-straddling constraint. Before we define the non-straddling constraint, let us first define for each demand $d_i$, sets $O_i \in P_i$ and $F_i \in P_f$ as the subsets of demand set D that share a wavelength with $d_i$ in the initial and the final layout, respectively. For the example layouts in FIGS. 1A and 1B, the sets $O_i$ and $F_i$ for demand B are $\{B, A\}$ and $\{B, F, G\}$, respectively. The non-straddling constraint is as follows: In any intermediate state during a transition sequence, demand $d_i$ either shares a wavelength with all demands in $F_i$ or a subset of demands in $O_i$.

The non-straddling constraint ensures that the partition for any intermediate state can be decomposed into subsets that either appear in the final partition $P_f$ or are subsets of sets in $P_o = \{\Theta_{o1} \ldots \Theta_{ok}\}$. Hence, each intermediate state $S_i$ with partition $P_i$ can be uniquely identified by the subsets in $\{P_i \cap P_f\}$. This reduces the state space to $2^{W_f}$, where $W_f$ is the number of occupied wavelengths (subsets in $P_f$) in the final layout. This number is often small in practice particularly in banded ROADM architectures where a circuit can only be moved within its own band. Typical bands comprise of eight or sixteen wavelengths. It is instructive to note that each state transition now corresponds to multiple circuit moves.

The non-straddling constraint not only reduces the state space but also ensures that if initial and final partitions of the demand set are routing-feasible, all other states are also feasible, provided there are sufficient number of free wavelengths. This is a very significant advantage since a circuit migration scheme does not involve routing. The disadvantage of imposing a constraint is we may miss some transition sequences and have to settle on a sequence that requires more free wavelengths. This may force the optimization at relatively lighter load when there are sufficient wavelengths available.

With constraints described above, the transition from initial partition to final partition of the demand set can be depicted as a bipartite graph, where each node of the graph corresponds to a subset in the initial or final partition and an edge represents migration of a demand from its initial subset to its final subset. We call this graph a transition graph represented by $G_{\psi, \psi'}$. The transition graph for FIG. 1B is shown in FIG. 3A.

Note that a transition graph may not necessarily be connected and may have multiple connected components. As is known, a "connected component" is a collection of nodes in the transition graph for which any node in the collection can be reached from at least one other node in the collection, see, e.g., T. H. Corman et al., "Introduction to Algorithms," 2nd ed., McGraw-Hill, 2001, the disclosure of which is incorporated by reference herein.

Under the single move and non-straddling constraint, each connected component of the transition graph is independent of other components, i.e., transition of demands in a connected component from initial state to their final states will not impact or can not be impacted by demands in other components. FIG. 3B shows the connected component decomposition for the transition graph of FIG. 3A. In FIG. 3B, the nodes in the graph that are connected by dashed lines comprise one connected component, while the nodes in the graph that are connected by solid lines comprise another connected component.

The decomposition of the transition graph allows for finding the transition sequence for each component independently. This reduces the state space to $\Sigma_j 2^{W_{jf}}$ where $W_{jf}$ is the number of nodes representing final partition $P_f$ in the jth connected component.

On a WDM ring of N nodes (N>>4), assuming uniform distribution, average path length for circuits is N/4, hence, an average number of circuits per wavelength is four. With four demands per wavelength, the transition graph for a ring with a large number of wavelengths (e.g., 16 or 32) contains many connected components and, hence, is tractable in practice. Connected components can be easily identified by a topological sort on the transition graph. One example of a topological sort technique that may be used is described in the above-referenced T. H. Corman et al., "Introduction to Algorithms." Components with just two nodes represent no circuit moves and, hence, need not be considered.

Required now is a procedure that, given a connected component of a transition graph, finds a transition sequence that requires the least number of free wavelengths, and a sequence in which transitions for each component should be performed.

II. ORRP Solution

In this section, we highlight a solution to ORRP utilizing the properties described in the previous sections. As stated above, a subproblem is to find a circuit migration for a connected component of transition graph utilizing the single move and non-straddling constraint. A goal here is to find a sequence that requires a minimum number of free wavelengths.

Given is a connected component of a transition graph with $W_o$ nodes representing the initial state and $W_f$ nodes representing the final state. From the previous sections, we know that the number of states is given by $2^{W_f}$. For each state i, we define $W_i$ as the number of subsets (wavelengths) required (excluding the free wavelengths). We also define $N_{ij}$ as the minimum number of extra wavelengths needed to reach from state $S_i$ to $S_j$. We are interested in $N_{of}$ and the corresponding intermediate states. For a path in the state space from $S_j$ to $S_f$ via an intermediate state $S_i$:

$$N_{jif} = N_{ji} + \max(0, (N_{if} - (W_j - W_i))) \quad (1)$$

$$N_{of} = \min(N_{oif}) \forall \text{ states } i \quad (2)$$

We can write an effective dynamic program to find optimal migration. For an efficient dynamic program, we need to represent a state with a minimal set of variables. A state can be represented as a bit vector of size $W_f$, with each bit corresponding to a subset in the final partition. The initial state corresponds to all zeroes, while the final state corresponds to all ones. Apart from state representation as a bit vector, three variables are needed, namely, $W_i$, $N_{if}$ and an index $I_i$ of a next state in the optimal sequence to the final state.

In equation (1), if $S_i$ is obtained from $S_j$ such that $\{P_i \cap P_f\} - \{P_j \cap P_f\} = T$, then $N_{ji}$ is zero if there exist $\Theta_{ix} \in P_i$ such that $\Theta_{ix} \subseteq T$ otherwise it is one. Note that if $\Theta_{ix}$ has just one demand, then it may be required to change its orientation depending on the final orientation of the demand. If $\Theta_{ix}$ has more than one demand, then demands are guaranteed to be in a correct final orientation state. Further, as a boundary condition $N_{ff}=0$.

FIG. 4 shows illustrative pseudo-code of a dynamic programming-based hitless migration algorithm 400, according to an embodiment of the present invention. At the termination of the dynamic program, initial state $S_o$ can be started at and the sequence of states indexed by $I_i$ can be traversed to obtain all the intermediate states in transition requiring the minimum number of free wavelengths.

Figure 6:
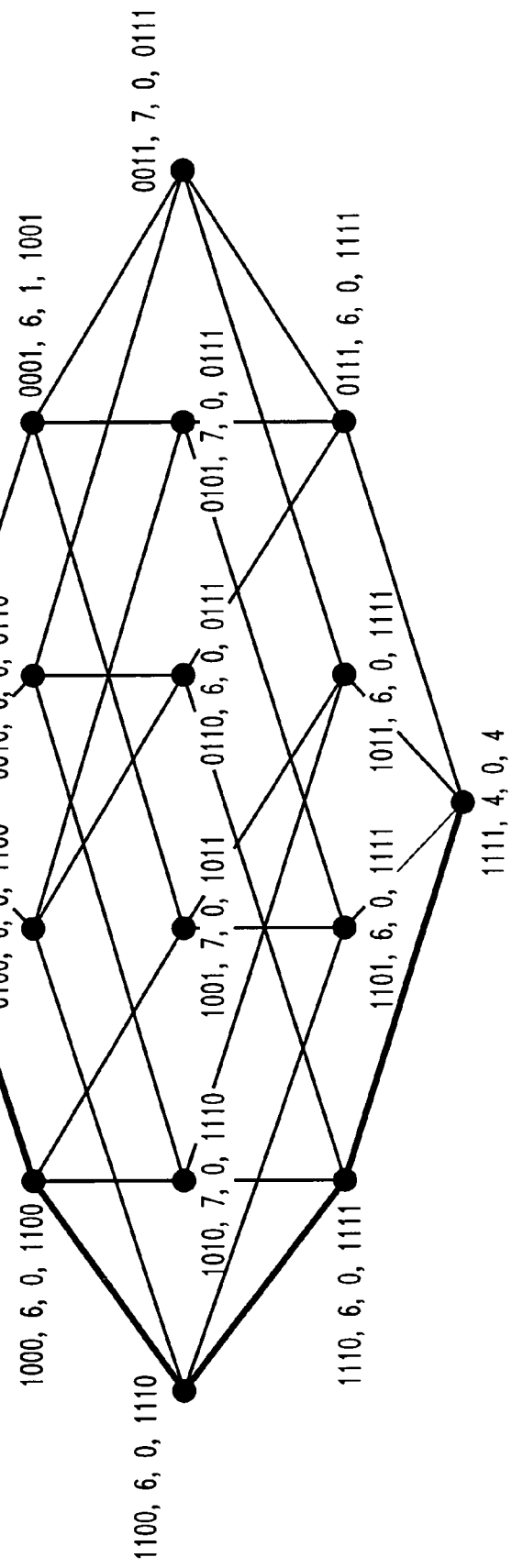
FIG. 6 shows a state diagram for the transition graph of FIG. 5, according to an embodiment of the present invention.
Figure 7:
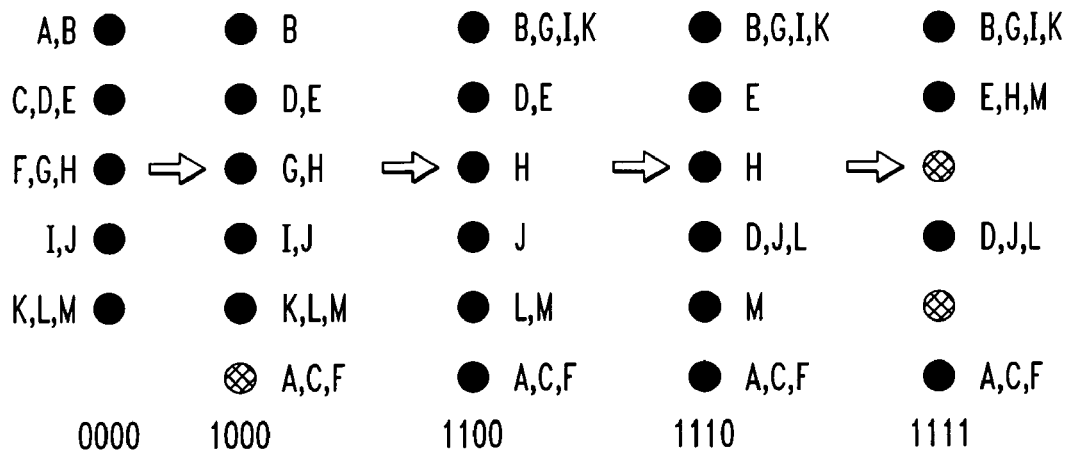
FIG. 7 shows a diagram of an optimal transition sequence for the state diagram of FIG. 6.

FIG. 5 shows a sample connected component of a transition graph. The state space along with the dynamic programming state variables is shown in FIG. 6. The highlighted path shows the optimal transition requiring just one free wavelength. The actual circuit moves can be trivially obtained by noting the set of circuits that differ in their partition from the next intermediate state given by $I_i$. The transitions corresponding to the path highlighted in FIG. 6 are as shown in FIG. 7. The dynamic programming algorithm of FIG. 4 can be run independently for each connected component of the transition graph.

The order in which different connected components of the transition graph are migrated is also important to minimize the number of free wavelengths for the entire transition graph. The components can be migrated in the ascending order of their free wavelength requirements. Hence, if there are k components with their free wavelength requirements $r_1, \ldots, r_k$ and the number of wavelengths freed by each is $f_1, \ldots, f_k$, then the number of free wavelengths needed initially to perform all transitions is:

$$W = \max\left(r_i - \sum_{j=1}^{i-1} f_j\right) \forall i \in \{1, \ldots, k\} \quad (3)$$

Accordingly, as illustratively explained above, the present invention provides for online optimization of WDM rings (or rings of other ring-based networks) to improve their bandwidth utilization. Online optimization is becoming a critical requirement as service providers have lower budgets for network expansion. Unlike traditional network design tools that route demands on a green-field network, online optimizations occur on live networks and, thereby, are required to cause no service disruption. In accordance with the invention, an efficient dynamic programming algorithm is provided to reroute existing circuits to the optimal layout.

Furthermore, the invention has some key network management implications. Traditionally, engineering is done very infrequently due to the high overhead from traffic disruption. However, in accordance with the techniques of the invention, it is now possible to continually monitor the network and pro-actively engineer it to maintain high levels of network utilization. In turn, this enables greater network efficiency and lowers capital expenditure in the long run.

It is to be appreciated that one skilled in the art, given the teachings herein, will realize various modifications that can be made to the above methodologies. For example, the pseudo-code in FIG. 4 can be optimized to save not all states but only the ones on the possible transition sequences.

III. Illustrative Hardware Implementation

Figure 8:
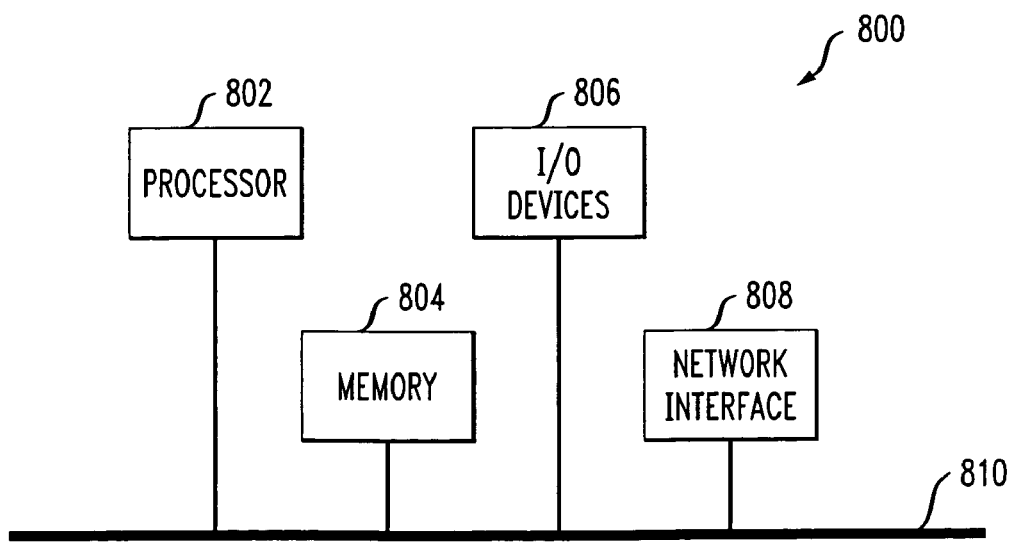
FIG. 8 shows a block diagram of a generalized hardware architecture of a computer system suitable for implementing a system for optimizing utilization in a ring-based network, according to an embodiment of the present invention.

Referring now to FIG. 8, a block diagram illustrates a generalized hardware architecture of a computer system suitable for implementing a system for optimizing utilization in a ring-based network, according to an embodiment of the present invention. More particularly, it is to be appreciated that computer system 800 in FIG. 8 may be used to implement and perform the methodologies of the invention, as illustratively described above in the context of FIGS. 1A through FIG. 7. Also, it is to be understood that one or more network elements may implement such a computing system 800. Of course, it is to be understood that the invention is not limited to any particular computing system implementation.

Thus, computing system 800 could be used to determine an optimum circuit transition plan in accordance with the methodologies of the invention described herein such that the plan could then be implemented online on the subject network by a service provider.

In this illustrative implementation, a processor 802 for implementing at least a portion of the methodologies of the invention is operatively coupled to a memory 804, input/output (I/O) device(s) 806 and a network interface 808 via a bus 810, or an alternative connection arrangement. It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices.

The term "memory" as used herein is intended to include memory and other computer-readable media associated with a processor or CPU, such as, for example, random access memory (RAM), read only memory (ROM), fixed storage media (e.g., hard drive), removable storage media (e.g., diskette), flash memory, etc.

In addition, the phrase "I/O devices" as used herein is intended to include one or more input devices (e.g., keyboard, mouse, etc.) for inputting data to the processing unit, as well as one or more output devices (e.g., CRT display, etc.) for providing results associated with the processing unit. It is to be appreciated that such input devices may be one mechanism for a user to provide the inputs used by a system of the invention to generate optimized network utilization results. Alternatively, the inputs could be read into the system from a diskette or from some other source (e.g., another computer system) connected to the computer bus 810. Also, inputs to the methodologies may be obtained in accordance with the one or more input devices. The output devices may be one mechanism for a user or other computer system to be presented with results of the methodologies of the invention.

Still further, the phrase "network interface" as used herein is intended to include, for example, one or more devices capable of allowing the computing system 800 to communicate with other computing systems. Thus, the network interface may comprise a transceiver configured to communicate with a transceiver of another computer system via a suitable communications protocol. It is to be understood that the invention is not limited to any particular communications protocol.

It is to be appreciated that while the present invention has been described herein in the context of networks, the methodologies of the present invention may be capable of being distributed in the form of computer readable media, and that the present invention may be implemented, and its advantages realized, regardless of the particular type of signal-bearing media actually used for distribution. The term "computer readable media" as used herein is intended to include recordable-type media, such as, for example, a floppy disk, a hard disk drive, RAM, compact disk (CD) ROM, etc., and transmission-type media, such as digital or analog communication links, wired or wireless communication links using transmission forms, such as, for example, radio frequency and optical transmissions, etc. The computer readable media may take the form of coded formats that are decoded for use in a particular data processing system.

Accordingly, one or more computer programs, or software components thereof, including instructions or code for performing the methodologies of the invention, as described herein, may be stored in one or more of the associated storage media (e.g., ROM, fixed or removable storage) and, when ready to be utilized, loaded in whole or in part (e.g., into RAM) and executed by the processor 802.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

I claim:

1. A method for use in performing a circuit transition in accordance with an optical ring-based network, comprising the steps of:
    obtaining a first circuit layout and a second circuit layout for a given set of demands to be routed on the optical ring-based network; and
    calculating a minimum number of free wavelengths required to transition the network from the first circuit layout to the second circuit layout such that substantially no network service disruption occurs due to the circuit transition;
    wherein the first circuit layout and the second circuit layout are each represented as a partition of the given set of demands into subsets, further wherein each subset is capable of being routed on a single wavelength;
    wherein the calculating step does not require consideration of which wavelength each subset is routed on in a given circuit layout; and
    wherein the steps are performed by a processor.

2. The method of claim 1, wherein the first circuit layout is an initial circuit layout and the second circuit layout is a final circuit layout.

3. The method of claim 1, wherein the optical ring-based network comprises a wavelength division multiplexing network, a synchronous optical network, or a synchronous digital hierarchy network.

4. The method of claim 1, wherein the calculating step comprises application of a constraint that a circuit can be moved at most once in a transition sequence.

5. A method for use in performing a circuit transition in accordance with an optical ring-based network, comprising the steps of:
    obtaining a first circuit layout and a second circuit layout for a given set of demands to be routed on the optical ring-based network; and
    calculating a minimum number of free wavelengths required to transition the network from the first circuit layout to the second circuit layout such that substantially no network service disruption occurs due to the circuit transition;
    wherein the first circuit layout and the second circuit layout are each representable as a partition of the given set of demands into subsets, further wherein each subset is capable of being routed on a single wavelength;
    wherein the calculating step comprises application of a constraint that, in any intermediate state during a transition sequence, a demand $d_i$ either shares a wavelength with all demands in a set $F_i$ or a subset of demands in a set $O_i$, where, for the demand $d_i$, sets $O_i$ and $F_i$ are subsets of the given set of demands that share a wavelength with $d_i$ in the first circuit layout and the second circuit layout, respectively; and
    wherein the steps are performed by a processor.

6. The method of claim 5, wherein the calculating step further comprises representing a transition from a first partition to a second partition of the demand set as a bipartite transition graph having nodes and edges, wherein each node of the graph corresponds to a subset in the first or second partition and each edge of the graph represents a transition of a demand from its first subset to its second subset.

7. The method of claim 6, wherein the calculating step further comprises:
    inputting a connected component of the transition graph, the given set of demands, a first partition set $P_o$ and a second partition set $P_f$; and
    determining a transition sequence of intermediate states that require the minimum number of free wavelengths.

8. The method of claim 7, wherein the connected component of the transition graph comprises $W_o$ nodes representing an initial state and $W_f$ nodes representing a final state.

9. The method of claim 8, wherein, for each state i, $W_i$ represents the number of required wavelengths excluding the free wavelengths.

10. The method of claim 9, wherein $N_{ij}$ represents the minimum number of extra wavelengths needed to reach from a state $S_i$ to a state $S_j$.

11. The method of claim 10, wherein, for a path in the state space from $S_j$ to $S_f$ via an intermediate state $S_i$, $N_{jf}=N_{ji}+\max(0,(N_{if}-(W_j-W_i)))$, and $N_{of}=\min(N_{oif})$ $\forall$ states i.

12. The method of claim 10, wherein a state is represented as a bit vector of size $W_f$, with each bit corresponding to a subset in the second partition.

13. The method of claim 12, wherein if $S_i$ is obtained from $S_j$ such that $\{P_i \cap P_f\} - \{P_j \cap P_f\} = T$, then $N_{ji}$ is zero if there exist subsets $\Theta_{ix} \in P_i$ such that $\Theta_{ix} \subseteq T$, otherwise $N_{ji}$ is one.

14. The method of claim 13, wherein the calculating step further comprises transitioning different connected components of the transition graph in an ascending order with respect to their free wavelength requirements.

15. The method of claim 5, wherein the calculating step comprises application of a further constraint that a circuit can be moved at most once in a transition sequence.

16. The method of claim 5, wherein the first circuit layout is an initial circuit layout and the second circuit layout is a final circuit layout.

17. The method of claim 5, wherein the optical ring-based network comprises a wavelength division multiplexing network, a synchronous optical network, or a synchronous digital hierarchy network.

18. Apparatus for use in performing circuit transition in accordance with an optical ring-based network, comprising:
   a memory; and
   at least one processor coupled to the memory and operative to: (i) obtain a first circuit layout and a second circuit layout for a given set of demands to be routed on the optical ring-based network; and (ii) calculate a minimum number of free wavelengths required to transition the network from the first circuit layout to the second circuit layout such that substantially no network service disruption occurs due to the circuit transition;
   wherein the first circuit layout and the second circuit layout are each represented as a partition of the given set of demands into subsets, further wherein each subset is capable of being routed on a single wavelength; and
   wherein the calculating step does not require consideration of which wavelength each subset is routed on in a given circuit layout.

19. The apparatus of claim 18, wherein the first circuit layout is an initial circuit layout and the second circuit layout is a final circuit layout.

20. An article of manufacture comprising a machine-readable storage medium of a recordable type, the medium storing one or more programs for use in performing circuit transition in accordance with an optical ring-based network, the one or more programs when executed in a processor implementing a method comprising the steps of:
   obtaining a first circuit layout and a second circuit layout for a given set of demands to be routed on the optical ring-based network; and
   calculating a minimum number of free wavelengths required to transition the network from the first circuit layout to the second circuit layout such that substantially no network service disruption occurs due to the circuit transition;
   wherein the first circuit layout and the second circuit layout are each represented as a partition of the given set of demands into subsets, further wherein each subset is capable of being routed on a single wavelength; and
   wherein the calculating step does not require consideration of which wavelength each subset is routed on in a given circuit layout.

* * * * *

UNITED STATES PATENT AND TRADEMARK OFFICE
CERTIFICATE OF CORRECTION

PATENT NO. : 7,660,525 B2
APPLICATION NO. : 11/065839
DATED : February 9, 2010
INVENTOR(S) : Pankaj Risbood It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 982 days.

Signed and Sealed this

Twenty-eighth Day of December, 2010

David J. Kappos
*Director of the United States Patent and Trademark Office*